Oct. 9, 1928.
T. P. LITTLE
1,687,340
BEVELING AND SEALING CLAMP
Filed Aug. 12, 1925
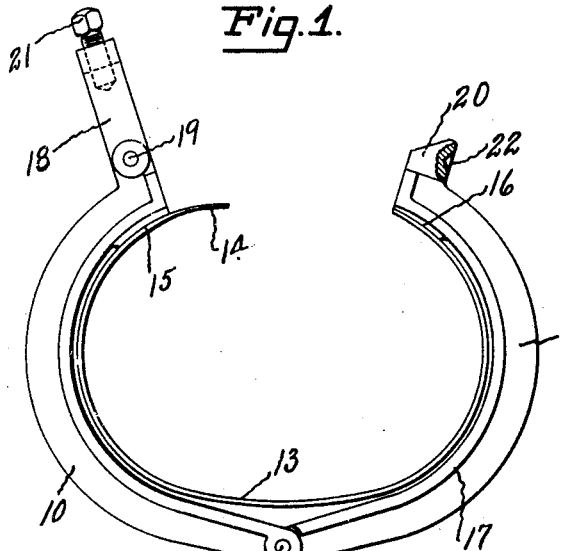
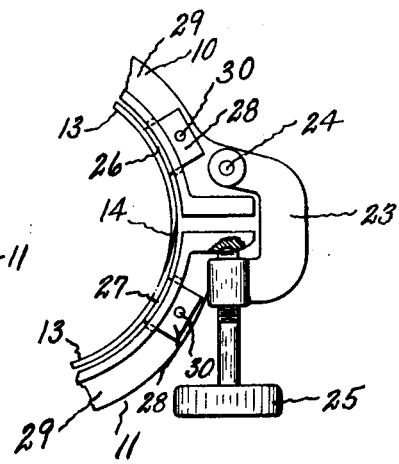
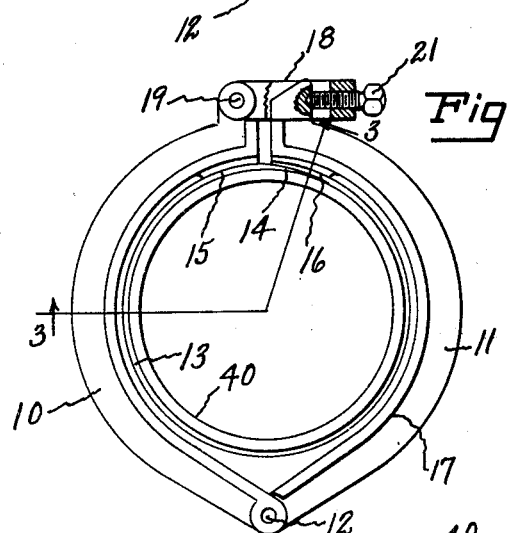
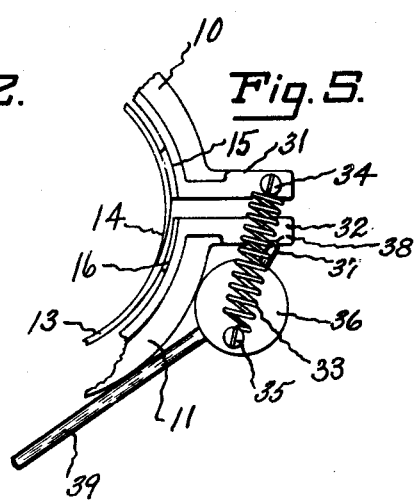
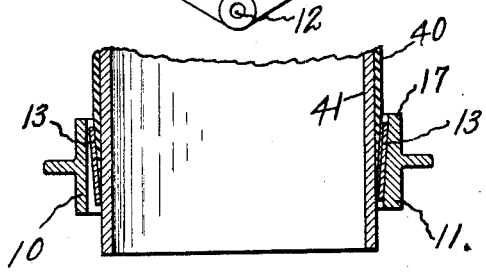
INVENTOR.
Thomas P. Little
BY
Edward C. Taylor
ATTORNEY.

Patented Oct. 9, 1928.

1,687,340

UNITED STATES PATENT OFFICE.

THOMAS P. LITTLE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

BEVELING AND SEALING CLAMP.

Application filed August 12, 1925. Serial No. 49,691.

This invention relates to clamps used for sealing the ends of a rubber tube to mandrels during vulcanization and at the same time skiving the ends of the tube so as to obviate the necessity of doing this operation at a later stage in the manufacture. One object of the invention is to provide a sealing clamp which will be easy to apply and to remove from the tube. Another object is to provide a clamp which will produce a smooth skive on the end of the tube without the formation of any substantial ridge or fin where the opening in the clamp occurs. Another object is to provide a clamp which will exert a yielding and constant pressure on the end of the tube during vulcanization. Other and further objects will appear from the following description.

Referring to the drawings,

Fig. 1 is a view of one form of clamp made in accordance with my invention, the clamp being shown in open position;

Fig. 2 is a similar view showing the clamp closed;

Fig. 3 is a section on line 3—3 of Fig. 2;

Fig. 4 is a detail showing another form of fastening means for the clamp; and

Fig. 5 is a similar detail showing an alternative fastening means adapted to exert a steady and yielding pressure on the end of the tube during vulcanization.

In the forms which have been shown in the drawings, the clamp is formed in three parts— an outside casing, a flexible skiving member carried by the casing and adapted to do the actual sealing and skiving of the tube, and means for holding the casing tightly closed upon the tube. In the forms shown the casing is formed in two parts 10 and 11, hinged at 12 to permit the casing to open and close. The skiving member is formed of a spring sheet metal strip 13 which is shaped, as is best shown in Fig. 3, in the form of the frustum of a cone and having one end tapered as at 14. In the forms shown in Figs. 1, 2, 3 and 5 this flexible band is fastened to the casing at 15 and 16, being free at all other points. The fastening at the points 15 and 16 may be done by riveting to the flange 17 of the casing, or by spot welding at these points.

It is in the means provided for holding the casing closed that the greatest difference occurs between the forms illustrated. In that form shown in Figs. 1, 2 and 3 a yoke 18 is pivoted to the member 10 at 19 and extends over a lug 20 formed on the end of the member 11. A set screw 21 is threaded through the cross bar of the yoke and fits into a depression 22 in the lug 20. By slipping the yoke over the lug 20 and tightening the set screw the casing can be closed about the tube and held tightly and firmly in place as shown in Fig. 2.

A somewhat different form of fastening means is shown in Fig. 4. In this the yoke 20 is replaced by a hook 23 pivoted at 24 and carrying a hand screw 25, the end of which fits into the depression 22 in the same manner as was the case with the screw 21. This figure also shows another modification in the manner of securing the band 13 to the casing. Instead of fastening the band at 15 and 16 rigidly to the casing, it is secured in a similar manner to blocks 26 and 27 having flanges 28 straddling the central flange 29 of the casing and pivoted to it by pins 30. This construction permits the band to adjust itself to inequalities in the end of the tube and gives a more even pressure on the rubber.

In the modification shown in Fig. 5 means have been provided for exerting steady pressure on the rubber during the entire period of vulcanization. In this form the parts 10 and 11 of the casing are provided with lugs 31 and 32 which face each other and are spaced a short distance apart. A spring 33 is attached to a pin 34 on the lug 31. The other end of the spring is attached to a pin 35 on a member 36 which in the case shown is substantially circular in form. On one side of this circular member is a pin 37 adapted to fit into a shallow recess 38 in the outer face of the lug 32. The position of this recess is so chosen that when the parts are in the position of Fig. 5, action of the toggle thus formed will cause the member 36 to rest on the half 11 of the casing. A handle 39 attached to the member 36 enables the latching means to be quickly swung either to its locking or to its inactive position. This form of the invention has the advantage that as the rubber softens during vulcanization the spring 33 will cause the clamp to continue to close, preventing any danger of the clamp not being tight enough to seal the tube against the entry of steam from leaking between the tube 40 and the mandrel 41 during vulcanization. The handle 39 can be made detachable if desired so as not to interfere with the stacking of the tubes and clamps in the vulcanizer.

It will be seen from the above description that the clamp when applied presents a smooth inner surface to the tube, the tapered end 14 of the band 13 lying snugly against the other end, leaving only a very small offset. This construction will enable the tube to be molded with a smooth outer surface having only a minimum of flash, by which is meant the small rib or fin of rubber which forms at the parting line of mold sections. A smooth tube which will be ready for splicing with only slight buffing is thereby formed. The clamp can be quickly applied and equally quickly removed. The absence of contact between the band and the outer casing permits the band to shape itself to the inequalities of thickness of the rubber.

Various changes in the construction of the clamps herein described can be made without departing from the invention as set out in the following claims.

Having thus described my invention, I claim:

1. A beveling and sealing clamp for rubber tubes comprising an outer casing and a flexible band mounted in the casing but free to float thereon so as to adjust itself to the inequalities of the tube.

2. A beveling and sealing clamp for rubber tubes comprising a casing adapted to enclose the end of a tube, said casing being hinged at one side to permit its being opened and closed around the tube, means for holding the casing closed, and a flexible band held by the casing at two points and free for the rest of its length so that it may contract when the casing is closed and yet may adjust itself to the inequalities in the rubber.

3. A beveling and sealing clamp for rubber tubes comprising a casing hinged at one side and provided at its other side with means for holding it in closed position, and a band held in the casing at points near the open side of the latter and free therefrom at other points.

4. A beveling and sealing clamp for rubber tubes which comprises a flexible band of spring metal formed as the frustum of a cone, a casing surrounding the band, and means carried by the casing for contracting the band.

5. A beveling and sealing clamp for rubber tubes which comprises a flexible band of spring metal formed as a frustum of a cone, and a clamping member acting on said flexible band for causing the band to exert a steady compressive action on the rubber so as to adjust itself to the inequalities of the tube during vulcanization.

6. A tube shaping device adapted to be disposed about a cylindrical mandrel having an inner tube molded thereon comprising an annular member provided with overlapping end portions, one end portion being tapered to provide a substantially smooth inner annular surface, the latter being inclined with respect to the axis of the cylindrical mandrel, a latch secured to one of the end portions of the annular member, and a resilient member operative in conjunction with a latch for resiliently clasping the annular member about the mandrel.

7. A tube shaping device adapted to be disposed about a cylindrical mandrel having an inner tube molded thereon comprising an annular member provided with overlapping end portions, one end portion being tapered to provide a substantially smooth inner annular surface, the latter being inclined with respect to the axis of the cylindrical mandrel, a latch secured to one of the end portions of the annular member, a resilient member operative in conjunction with a latch for resiliently clasping the annular member about the mandrel, and a member for holding the latch in operative position.

THOMAS P. LITTLE.